United States Patent
Lynar et al.

(10) Patent No.: US 10,601,679 B2
(45) Date of Patent: Mar. 24, 2020

(54) DATA-CENTRIC PREDICTIVE CONTAINER MIGRATION BASED ON COGNITIVE MODELLING

(71) Applicant: INTERNATIONAL BUSINESS MACHINES CORPORATION, Armonk, NY (US)

(72) Inventors: Timothy M. Lynar, Melbourne (AU); Suraj Pandey, Park Orchards (AU); Gandhi Sivakumar, Bentleigh (AU); John Wagner, Carlton (AU)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 93 days.

(21) Appl. No.: 15/854,098

(22) Filed: Dec. 26, 2017

(65) Prior Publication Data
US 2019/0199601 A1   Jun. 27, 2019

(51) Int. Cl.
| H04L 12/24 | (2006.01) |
| H04L 29/08 | (2006.01) |
| H04L 12/26 | (2006.01) |
| G06F 3/06 | (2006.01) |
| G06N 5/04 | (2006.01) |

(52) U.S. Cl.
CPC ........ *H04L 41/5009* (2013.01); *G06F 3/0647* (2013.01); *H04L 41/145* (2013.01); *H04L 41/5025* (2013.01); *H04L 43/08* (2013.01); *H04L 43/16* (2013.01); *H04L 67/1008* (2013.01); *G06N 5/047* (2013.01); *H04L 67/10* (2013.01)

(58) Field of Classification Search
CPC ......... H04L 43/08; H04L 67/10; H04L 43/16; G06F 3/0647
See application file for complete search history.

(56) References Cited

U.S. PATENT DOCUMENTS

| 9,172,588 | B2 | 10/2015 | Kalyanaraman |
| 9,350,596 | B2 | 5/2016 | Wang et al. |
| 10,109,214 | B2 * | 10/2018 | Baughman ............... G09B 7/00 |
| 10,191,778 | B1 * | 1/2019 | Yang .................. G06F 9/45558 |
| 10,318,314 | B2 * | 6/2019 | Kumar .................... G06F 9/445 |
| 10,341,438 | B2 * | 7/2019 | Jain ........................ G06F 11/07 |

(Continued)

OTHER PUBLICATIONS

Spandan Bemby et al. "ViNO: SDN Overlay to Allow Seamless Migration Across Heterogeneous Infrastructure", 2015 IFIP/IEEE International Symposium on Integrated Network Management (IM2015); pp. 783-785.

*Primary Examiner* — Lashonda T Jacobs
(74) *Attorney, Agent, or Firm* — F. Chau & Associates, LLC

(57) ABSTRACT

A method of migrating a container includes: monitoring, by a processor, a plurality of applications executing on a system to generate monitored data, where each application includes at least one container; building, by the processor, a behavior model using the monitored data; selecting, by the processor, a destination data-center among a plurality of available data-centers and one of the containers to migrate to the selected data-center based on data of the behavior model; and migrating, by the processor, the selected container from a source data-center among the available data-centers to the destination data-center.

17 Claims, 5 Drawing Sheets

(56) References Cited

U.S. PATENT DOCUMENTS

| | | | |
|---|---|---|---|
| 2012/0042033 A1 | 2/2012 | Ayala, Jr. et al. | |
| 2012/0174104 A1 | 7/2012 | Neogi et al. | |
| 2014/0137125 A1* | 5/2014 | Hsu | G06F 9/4856 718/102 |
| 2014/0359103 A1 | 12/2014 | Dalmau et al. | |
| 2015/0012665 A1 | 1/2015 | Kang et al. | |
| 2015/0032961 A1* | 1/2015 | Sanford | G06F 16/119 711/118 |
| 2015/0052525 A1 | 2/2015 | Raghu | |
| 2015/0096011 A1 | 4/2015 | Watt | |
| 2015/0195141 A1 | 7/2015 | Luft | |
| 2016/0048407 A1 | 2/2016 | Alicherry et al. | |
| 2016/0127202 A1 | 5/2016 | Dalvi et al. | |
| 2016/0283713 A1* | 9/2016 | Brech | G06F 9/45558 |
| 2016/0330277 A1* | 11/2016 | Jain | H04L 67/1095 |
| 2016/0359680 A1* | 12/2016 | Parandehgheibi | H04L 43/0864 |
| 2017/0052807 A1* | 2/2017 | Kristiansson | G06F 9/54 |
| 2017/0257424 A1* | 9/2017 | Neogi | H04L 43/16 |
| 2017/0353361 A1* | 12/2017 | Chopra | H04L 41/147 |
| 2018/0019969 A1* | 1/2018 | Murthy | H04L 61/2084 |
| 2018/0074748 A1* | 3/2018 | Makin | G06F 3/0604 |
| 2018/0109501 A1* | 4/2018 | Pawgi | H04L 63/0428 |
| 2018/0136931 A1* | 5/2018 | Hendrich | G06F 11/302 |
| 2018/0143856 A1* | 5/2018 | Du | G06F 9/5011 |
| 2018/0146069 A1* | 5/2018 | Du | H04L 67/1008 |
| 2018/0157508 A1* | 6/2018 | Chen | G06F 9/5033 |
| 2018/0246756 A1* | 8/2018 | Abali | G06F 9/4856 |
| 2018/0260155 A1* | 9/2018 | Cherian | G06F 3/0647 |
| 2018/0349168 A1* | 12/2018 | Ahmed | H04L 41/0816 |
| 2018/0375825 A1* | 12/2018 | Nataraja | H04L 61/256 |

* cited by examiner

DATA-CENTRIC PREDICTIVE CONTAINER MIGRATION BASED ON COGNITIVE MODELLING

BACKGROUND

1. Technical Field

The present disclosure relates generally to data migration, and more particularly to migration of containers.

2. Discussion of Related Art

In computing, a virtual machine is an emulation of a particular computer system. Virtual machines (VMs) operate based on the computer architecture and functions of a real or hypothetical computer. VMs rely on a hypervisor, which is normally installed atop the actual bare metal system hardware. Once the hypervisor layer is installed, VM instances can be provisioned from the system's available computing resources. Each VM can receive its own unique operating system and workload (e.g., one or more applications to execute).

Containers are arranged differently from VMs. With containers, a host operating (OS) system is installed on the system first, and then a container layer is installed atop the host OS. Once the container layer is installed, container instances can be provisioned from the system's available computing resources and applications can be deployed within the containers. Each container instance shares the same underlying host OS. Containers are regarded as more resource efficient than VMs.

Cloud users are now accustomed to using containers due to their indifference to the type and location of the operating system and the physical hardware the containers run on. These features enable users to install and configure any application in a container and migrate the container to any physical node at any data center for execution. However, it can be difficult to determine which datacenter is best to migrate a container.

BRIEF SUMMARY

According to an exemplary embodiment of the inventive concept, a method of migrating a container includes: monitoring, by a processor, a plurality of applications executing on a system to generate monitored data, where each application includes at least one container; building, by the processor, a behavior model using the monitored data; selecting, by the processor, a destination data-center among a plurality of available data-centers and one of the containers to migrate to the selected data-center based on data of the behavior model; and migrating, by the processor, the selected container from a source data-center among the available data-centers to the destination data-center.

According to an exemplary embodiment of the inventive concept, a computer system is configured to migrate a container. The system includes a memory storing a computer program and a processor configured to execute the computer program. The computer program is configured to: monitor a plurality of applications executing on a system to generate monitored data, where each application includes at least one container; build a behavior model using the monitored data; select a destination data-center among a plurality of available data-centers and one of the containers to migrate to the selected data-center based on data of the behavior model; and migrate the selected container from a source data-center among the available data-centers to the destination data-center.

According to an exemplary embodiment of the inventive concept, a computer program product includes a computer readable storage medium having program instructions embodied therewith. The program instructions are executable by a computer to perform a method including: monitoring a plurality of applications executing on a system to generate monitored data, where each application includes at least one container; building a behavior model using the monitored data; selecting a destination data-center among a plurality of available data-centers and one of the containers to migrate to the selected data-center based on data of the behavior model; and migrating the selected container from a source data-center among the available data-centers to the destination data-center.

BRIEF DESCRIPTION OF THE SEVERAL VIEWS OF THE DRAWINGS

Exemplary embodiments of the invention can be understood in more detail from the following descriptions taken in conjunction with the accompanying drawings in which.

DETAILED DESCRIPTION

Figure 1:
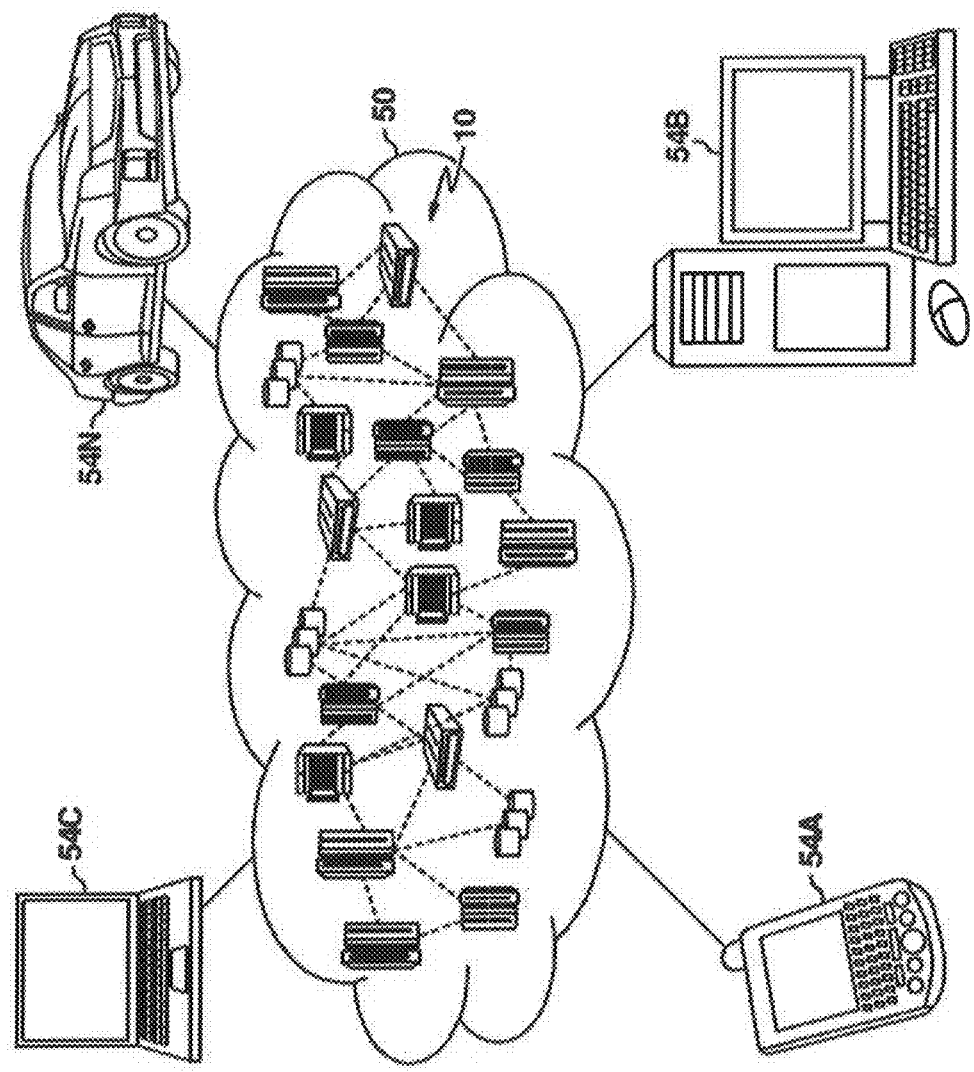
FIG. 1 illustrates a cloud computing environment according to an embodiment of the present invention.

The inventive concept will be described in more detail with reference to the accompanying drawings, where exemplary embodiments of the present disclosure have been illustrated. Throughout the drawings, same or like reference numerals are used to represent the same or like components. However, the present inventive concept can be implemented in various manners, and thus should not be construed to be limited to the embodiments disclosed herein. On the contrary, those embodiments are provided for the thorough and complete understanding of the present disclosure to convey the scope of the present disclosure to those skilled in the art.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed. Examples are the orchestration of a manufacturing process, a process to retrieve or store goods in a wholesale or retail store, a process to analyze a medical sample or set of samples, a process governing a series of chemical reactions, a process to analyze and file incoming paper documents in a financial institution, a process to manufacture a chemical substance, a process to monitor an automobile engine, a process to monitor a chemical reaction, or a process to monitor a medical device.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider. Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds). A cloud computing environment is service oriented with a focus on statelessness, low coupling, modularity, and semantic interoperability. At the heart of cloud computing is an infrastructure comprising a network of interconnected nodes. Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
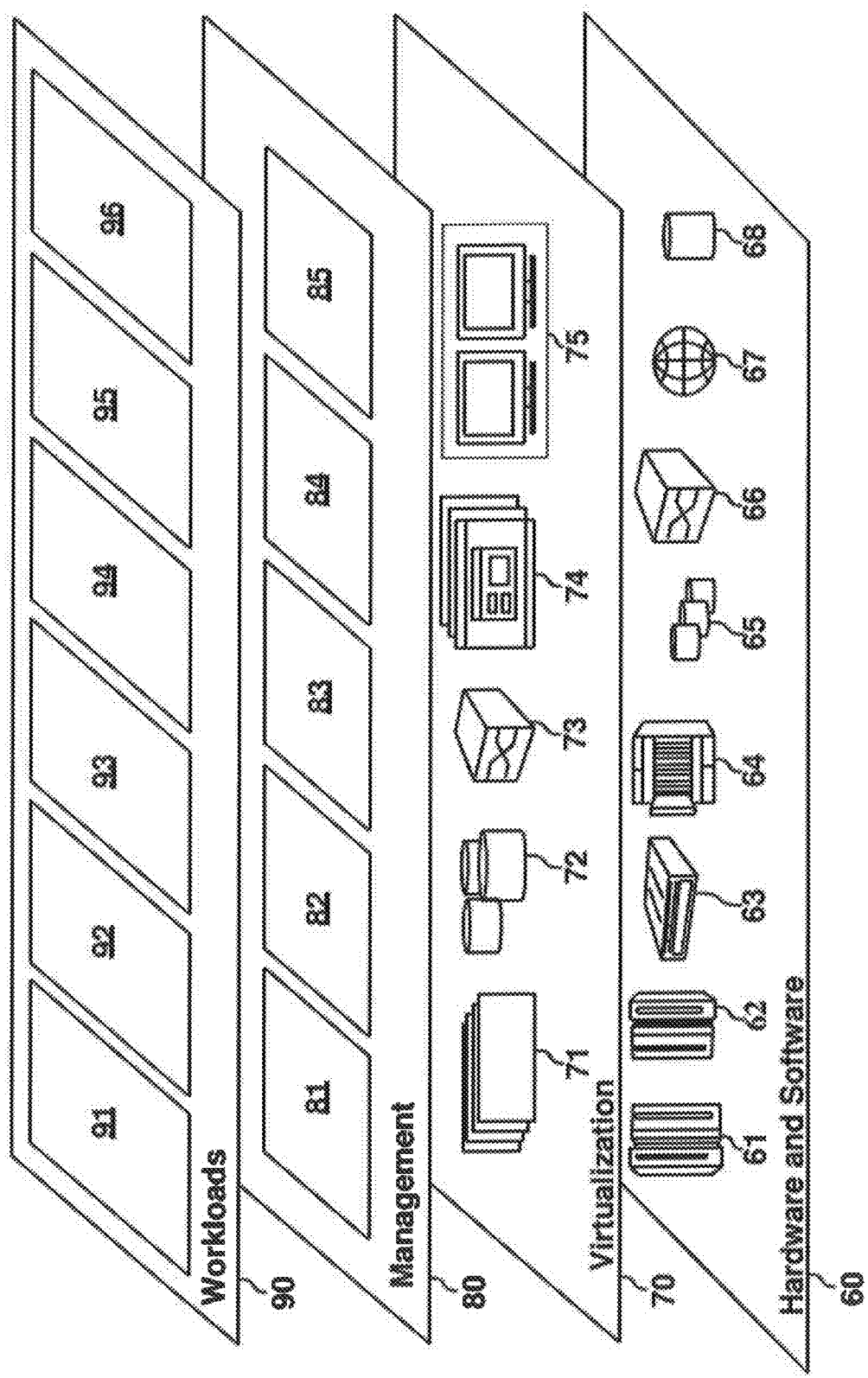
FIG. 2 depicts abstraction model layers according to an embodiment of the present invention, which may be used to implement a migration manager.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a migration manager 96. The migration manager 96 will be discussed in more detail below.

Figure 3:
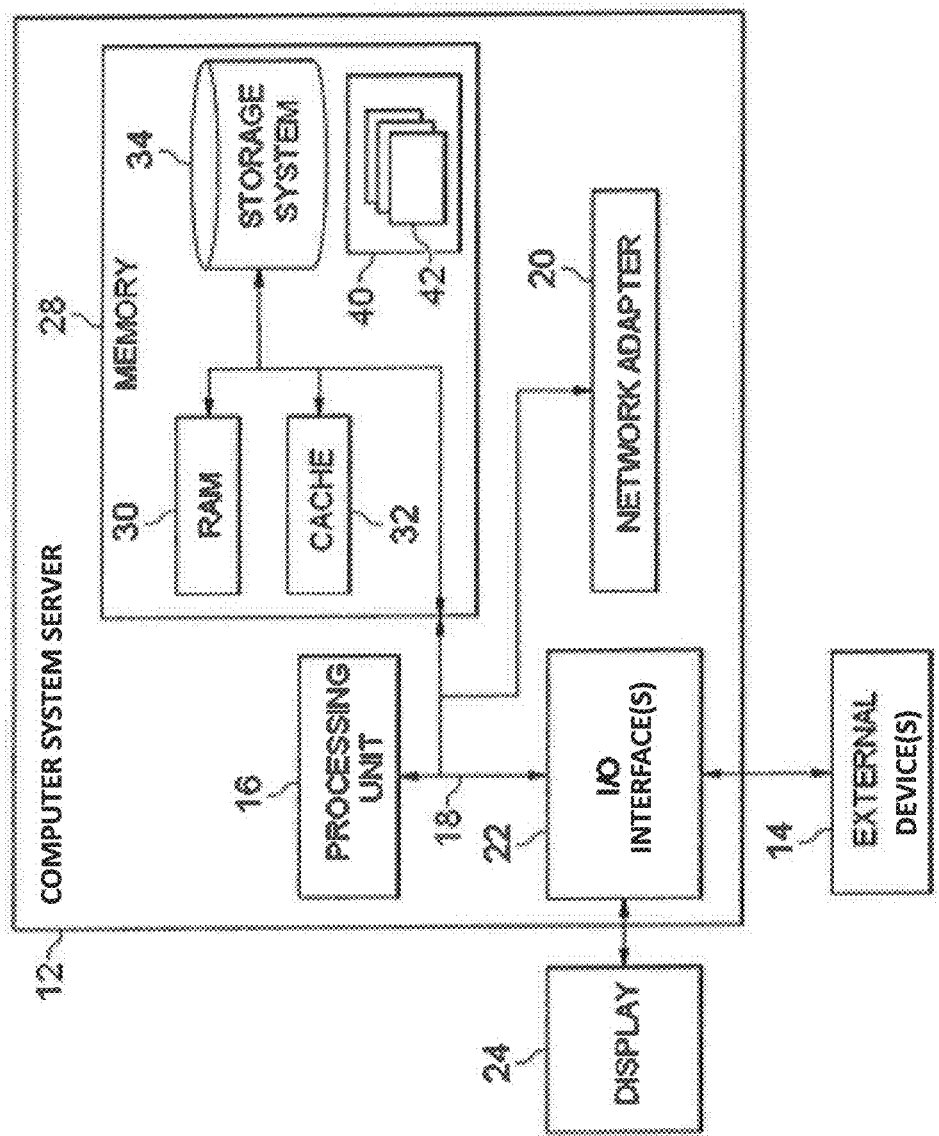
FIG. 3 shows an exemplary computer system which may be used to implement the migration manager.

FIG. 3 illustrates an embodiment of a computer server that may be used to implement part of computing devices 54A-54N, or the migration manager 96, which is applicable to implementing embodiments of the present invention. Computer system/server 12 is only illustrative and is not intended to suggest any limitation as to the scope of use or functionality of embodiments of the invention described herein.

As shown in FIG. 3, the computer system/server 12 is shown in the form of a general-purpose computing device. The components of the computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnect (PCI) bus.

The computer system/server 12 may include a variety of computer system readable media. Such media may be any available media that is accessible by the computer system/server 12, and it includes both volatile and non-volatile media, removable and non-removable media.

The system memory 28 can include computer system readable media in the form of volatile memory, such as random access memory (RAM) 30 and/or cache memory 32. The computer system/server 12 may further include other removable/non-removable, volatile/non-volatile computer system storage media. By way of example, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

A program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. The program modules 42 generally carry out the functions and/or methodologies of embodiments of the invention as described herein.

The computer system/server 12 may also communicate with one or more external devices 14 such as a keyboard, a pointing device, a display 24, etc.; one or more devices that enable a user to interact with the computer system/server 12; and/or any devices (e.g., network card, modem, etc.) that enable the computer system/server 12 to communicate with one or more other computing devices. Such communication can occur via Input/Output (I/O) interfaces 22. The computer system/server 12 can communicate with one or more networks such as a local area network (LAN), a general wide area network (WAN), and/or a public network (e.g., the Internet) via a network adapter 20. As depicted, the network adapter 20 communicates with the other components of computer system/server 12 via the bus 18. It should be understood that although not shown, other hardware and/or software components could be used in conjunction with the computer system/server 12. Examples of these other hardware and/or software components include, but are not limited to: microcode, device drivers, redundant processing units, external disk drive arrays, RAID systems, tape drives, and data archival storage systems.

Figure 4:
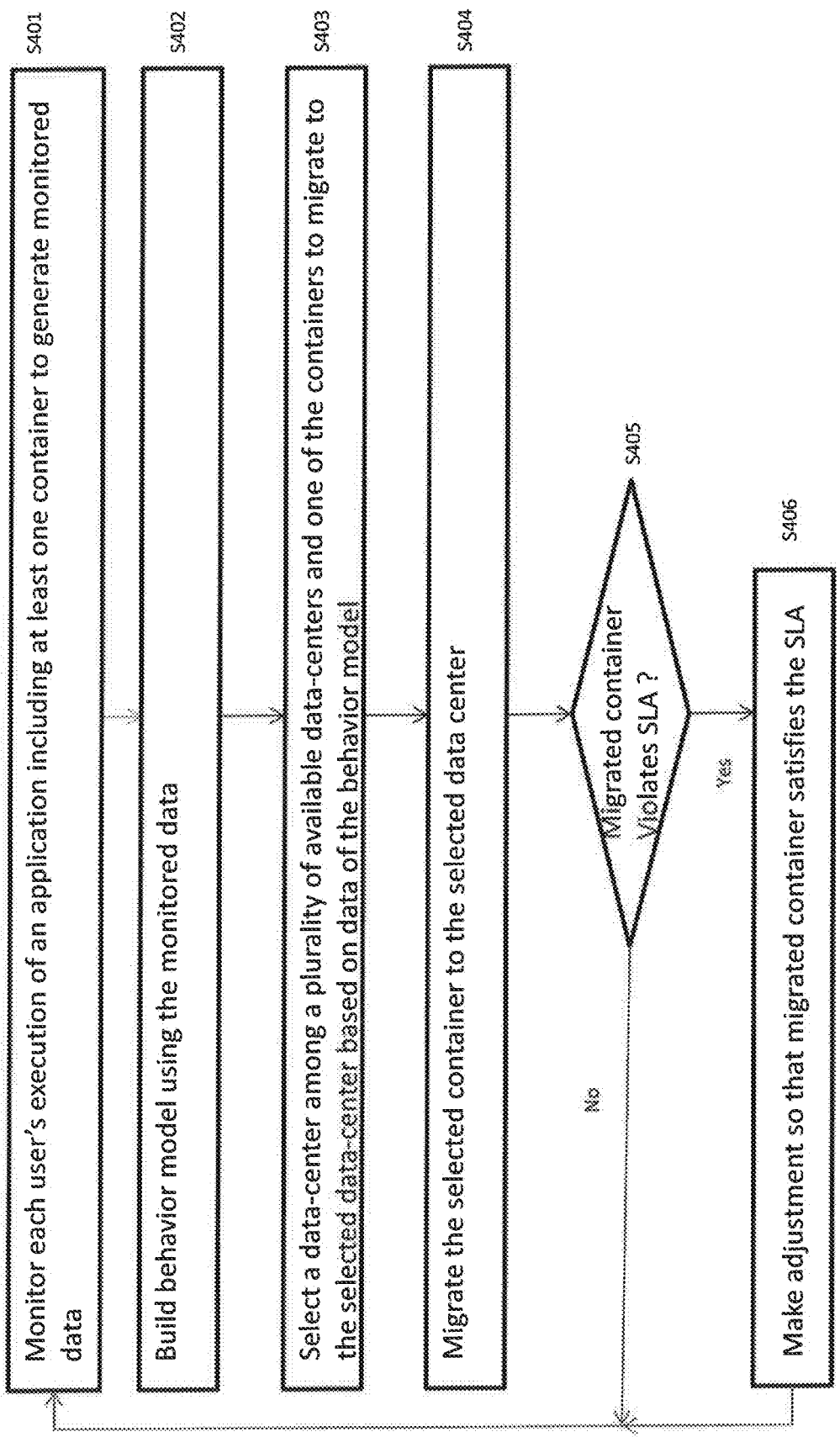
FIG. 4 illustrates a method of migrating a container according to an exemplary embodiment of the inventive concept.

FIG. 4 illustrates a method of migrating a container according to an exemplary embodiment of the inventive concept that may be performed by the migration manager 96.

Figure 5:
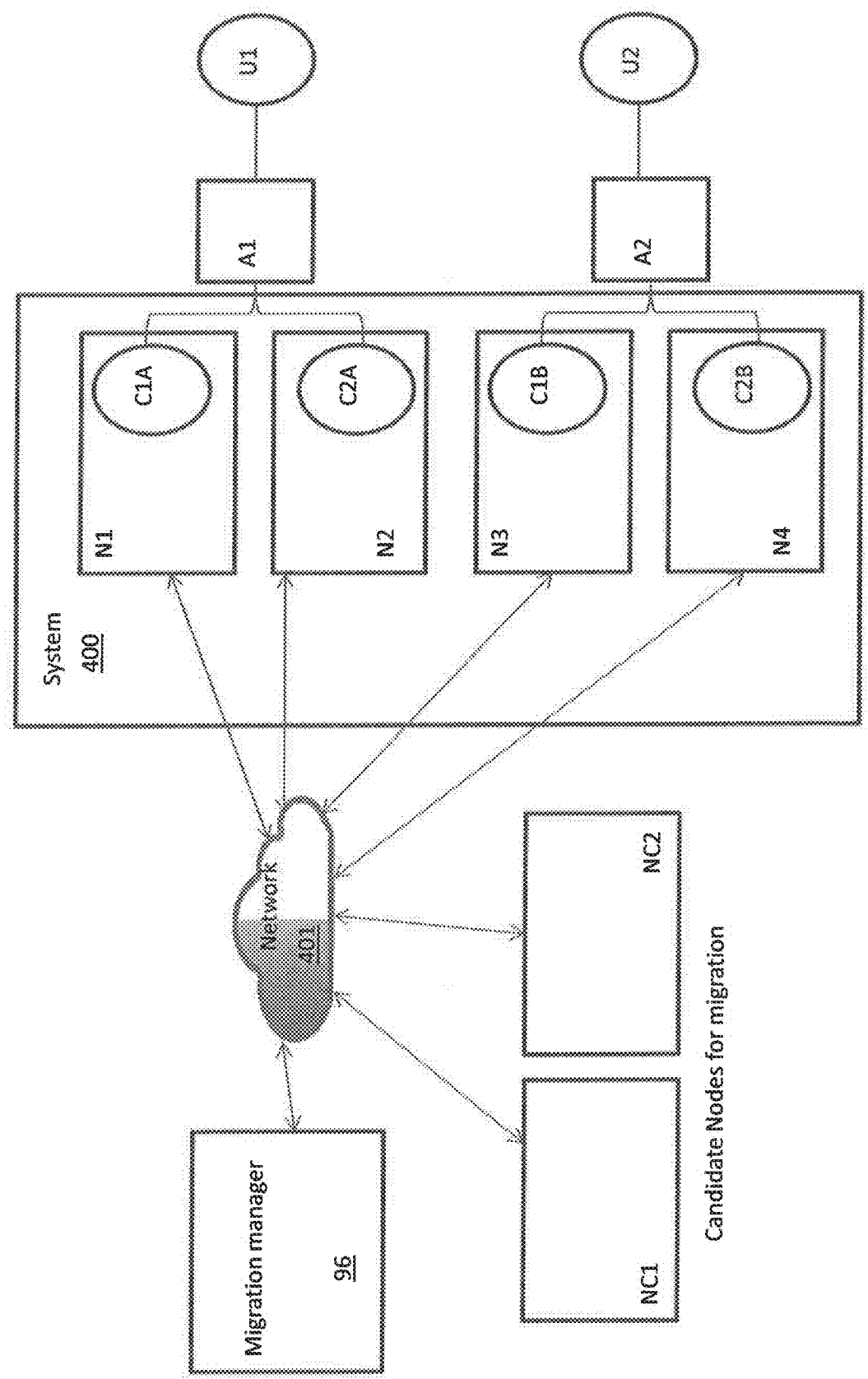
FIG. 5 illustrates a system in which the method may be applied.

The method includes monitoring each user's execution of an application including at least one container to generate monitored data (S401). As shown in FIG. 5, the migration manager 96 can monitor a system 400 that enables multiple users to run applications. The system 400 may be distributed across multiple computers or nodes that communicate with one another across a network 401 such as the Internet. For example, a first user U1 could be running a first application A1 including a first container C1A running on a first node N1 (e.g., a first computer) and a second container C2A running on node N2 (e.g., a second computer), whereas a second user U2 could be running a second application A2 including a first container C1B running on a third node N3 (e.g., a third computer) and a second container C2B running on a fourth node N4 (e.g., a fourth computer).

The monitoring may be performed by one or more application profilers and/or one or more instrumentation techniques to generate the monitored data.

In an embodiment, the application profiler measures at least one of the amount of memory that the containers use and the complexity of the containers. In an embodiment, the application profiler determines at least one of the number of times a particular instruction is used by each container, the frequency at which certain functions are executed by each container, the duration that each of these functions execute for, and usage of network resources between containers (e.g., frequency and quantity of data transferred).

The method further includes building a behavior model from the monitored data (S402). The behavior model may provide sufficient information to identify recent and historical application usage patterns and data usage patterns. The patterns may include the frequency and quantity of data transferred between the containers as a result of one or more user actions. For example, one container may have a web application server and another container may have a database or provide an API that the web application server relies upon. A pattern may be a repeating deterministic usage or load. API requests between containers 'a' and 'b' can be caused by examination of a route on a map. For example, a request for estimated travel time between any two locations will cause a certain number of API calls to known locations and result in the usage of services on known containers. Further, the behavior model may provide sufficient information to identify task interdependencies and data flows. For example, the behavior model may be used to identify whether two of the containers depend on one another. For example, if during a given monitoring period, it is determined that container C1A sends data to container C2A, it can be concluded that containers C1A and C2A are dependent on another. Further, since the data is sent from container C1A to C2A, it can be determined that data flows from container C1A to container C2A, but does not flow the other way. However, if during the given monitoring period, it is determined that container C1A does not send data to container C2A and container C1A does not receive data from container C2A, it can be determined that containers C1A and C2A act independently of one another. For example, it may not be desirable to move containers that are dependent on one another to nodes that are too far away. The behavior model can also be used to determine external library dependencies. For example, it is possible that a container (e.g., C1A) cannot run on a given node unless that node has a certain library. For example, if container C1A requires a library and node N1 does not contain the library, the container C1A may exit and write an error code into a log file on node N1 indicating container C1A could not run since the library was not found. Thus, it can be concluded that container C1A is dependent on the library. For example, if it is known that a given candidate node does not include the library, it can be concluded that the container C1A should not be migrated to the candidate node.

The method further includes selecting a data-enter (e.g., candidate node NC1) from among a plurality of available data-centers (e.g., NC1 and NC2) and one of the containers (e.g., C1A) to migrate to the selected data-center based on data of the behavior model (S403). For example, one or more of the above-described data provided by the behavior model may be used to select an optimal data-center and one of the containers to migrate the selected container. For example, if it is known that node N1 is going to be powered down for maintenance at a future date, container C1A will need to be migrated to another node at least temporarily.

Once the container for migration has been selected and the data-center to migrate the container has been selected, the selected container is migrated to the selected data-center (S404). For example, the migration manager 96 can migrate the first container C1A from the first node N1 to a first candidate node NC1 by suspending the instance of the container on the first node N1, creating an instance of the first container C1A on the first candidate node NC1, and deleting the instance of the container from the first node N1.

However, if the first container C1A routinely receives request messages from the second container C2A, while the first container C1A is being moved to the first candidate node NC1, these requests could be lost. Thus, in an embodiment, while the migration manager 96 is in the process of migrating the first container C1A, the migration manager 96 records these requests into a buffer, and then upon completing the migration, the migration manager 96 plays the recording so that the requests are sent to the container on the candidate node NC1. In an embodiment, the migration manager 96 suspends the second container C2A while the migration is being performed to prevent the second container C2A from sending requests to the first container C1A and then resumes the suspended container C2A after completing the migration. The second container can be made aware of the new IP address of the migrated first container C1A by updating a domain name server or by using a fully qualified domain name.

The migration may include setting environment variables on the candidate node NC1 to be the same as environment variables on the original node the container was from migrated from. For example, when the environment variables are stored in a configuration file on the original node that is accessed by the container, the configuration file is copied from the original node to the candidate node NC1 so the migrated container can access the configuration file. The migration may also include copying log files from the original node to the candidate node NC1. For example, if the container was constantly appending log information to a log file, the log file will need to be copied from the original node to the candidate node, so the container can continue updating the same log file.

The method further includes monitoring the migrated container to determine whether a service level agreement (SLA) has been violated (S405). For example, if the SLA indicates that the node the container runs on requires a minimum uptime (e.g., needs to be up 98% of the time) or a minimum average response time (e.g., must respond to queries within 500 milliseconds), and the migration manager 96 discovers that the candidate node NC1 has been down for too long or its responses are taking too long, the migration manager 96 may conclude the SLA has been violated.

The method then includes the migration manager 96 making adjustments so that the migrated container satisfies the SLA (S406). These adjustments may include migrating the container to a different candidate node. For example, the migration manager 96 may select a new data-center from among the candidate data-centers excluding the one that violated the SLA, and migrate the container to the new data-center. If the migrated container does not violate the SLA, the data migration manager 96 can resume monitoring execution of the applications by the user's so it can refine the behavior model.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of migrating a container, the method comprising:
    monitoring, by a processor, a plurality of applications executing on a system to generate monitored data, where each application includes at least one container from among a plurality of containers;
    building, by the processor, a behavior model using the monitored data, wherein the behavior model indicates a first container of the containers is dependent when the monitoring data indicates the first container communicates data with a second container of the containers;
    selecting, by the processor, a destination data-center among a plurality of available data-centers and the first container to migrate to the selected data-center based on data of the behavior model; and
    migrating, by the processor, the selected container from a source data-center among the available data-centers to the destination data-center, wherein the migrating comprises:
recording, by the processor, requests to the selected container into a buffer;
copying, by the processor, the selected container to the destination data-center after the recording; and
playing, by the processor, the recording for output of the requests to the destination data-center,
wherein the destination data-center is chosen such that a distance between the destination data-center and the source data-center storing the second container is less than a certain distance when the behavior model indicates the first container is dependent.

2. The method of claim 1, further comprising monitoring, by the processor, the selected container on the destination datacenter to determine whether the selected container has violated a service level agreement (SLA).

3. The method of claim 2, further comprising migrating the selected container to a data-center among the available data-centers other than the destination data-center when it is determined that the selected container has violated the SLA.

4. The method of claim 2, wherein the processor determines the selected container has violated the SLA when the selected container is down for a longer than a certain period of time required by the SLA.

5. The method of claim 2, wherein the processor determines the selected container has violated the SLA when an average response time of the selected container is less than a certain response time required by the SLA.

6. The method of claim 1, wherein the behavior model provides sufficient information to identify usage patterns including frequency of data transferred between the containers and quantity of data transferred between the containers.

7. The method of claim 1, wherein the behavior model provides sufficient information to identify task interdependencies between the containers.

8. The method of claim 1, wherein the behavior model provides sufficient information to determine external library dependencies of the containers.

9. The method of claim 1, wherein the requests are transmitted from one of the containers other than the selected container.

10. A computer system configured to migrate a container, the system comprising:
a memory storing a computer program; and
a processor configured to execute the computer program,
wherein the computer program is configured to: monitor a plurality of applications executing on a system to generate monitored data, where each application includes at least one container, build a behavior model using the monitored data; select a destination data-center among a plurality of available data-centers and a first container of the containers to migrate to the selected data-center based on data of the behavior model, and migrate the selected container from a source data-center among the available data-centers to the destination data-center,
wherein the behavior model indicates the first container is dependent when the monitoring data indicates the first container communicates data with a second container of the containers,
wherein the computer program performs the migrate by suspending a second container of the application determined from the behavior model as communicating with the selected container; copying the selected container to the destination data-center after the suspending; and resuming the suspended second container, and
wherein the destination data-center is chosen such that a distance between the destination data-center and the source data-center storing the second container is less than a certain distance when the behavior model indicates the first container is dependent.

11. The computer system of claim 10, wherein the computer program monitors the selected container on the destination datacenter to determine whether the selected container has violated a service level agreement (SLA).

12. The computer system of claim 11, wherein the computer program migrates the selected container to a data-center among the available data-centers other than the destination data-center when it is determined that the selected container has violated the SLA.

13. The computer system of claim 11, wherein the computer program determines the selected container has violated the SLA when the selected container is down for a longer than a certain period of time required by the SLA.

14. The computer system of claim 11, determines the selected container has violated the SLA when an average response time of the selected container is less than a certain response time required by the SLA.

15. A computer program product to migrate a container, the computer program product comprising a computer readable storage medium having program instructions embodied therewith, the program instructions executable by a computer to perform a method comprising:
monitoring a plurality of applications executing on a system to generate monitored data, where each application includes at least one container from among a plurality of containers, the monitoring data indicating whether a first container of the containers communicates data with a second container of the containers during a given monitoring period;
building a behavior model using the monitored data, wherein the behavior model indicates the first container is dependent when the monitoring data indicates the first container communicates data with the second container;
selecting a destination data-center among a plurality of available data-centers to migrate the first container based on data of the behavior model, wherein the destination data-center is chosen such that a distance between the destination data-center and a first source data-center of the available data-centers storing the second container is less than a certain distance when the behavior model indicates the first container is dependent; and
migrating the first container from a second source data-center among the available data-centers to the destination data-center.

16. The computer program product of claim 15, wherein the migrating comprises:
recording requests to the first container into a buffer;
copying the first container to the destination data-center after the recording; and
playing the recording r output of the r pests to the destination data-center.

17. The computer program product of claim 15, wherein the migrating comprises:
suspending a second container of the application determined from the behavior model as communicating with the first container;
copying the first container to the destination data-center after the suspending; and
resuming the suspended second container.

* * * * *